US010589213B2

(12) United States Patent
van Wagensveld et al.

(10) Patent No.: US 10,589,213 B2
(45) Date of Patent: Mar. 17, 2020

(54) VARIABLE SIDE COOLING FOR ACID GAS REMOVAL

(71) Applicant: Fluor Technologies Corporation, Sugar Land, TX (US)

(72) Inventors: Steven van Wagensveld, Aliso Viejo, CA (US); Dave Schulte, Anaheim, CA (US); Bryant Lynch, Rancho Santa Margarita, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 51 days.

(21) Appl. No.: 15/684,776

(22) Filed: Aug. 23, 2017

(65) Prior Publication Data

US 2018/0056231 A1   Mar. 1, 2018

Related U.S. Application Data

(60) Provisional application No. 62/381,138, filed on Aug. 30, 2016.

(51) Int. Cl.
*B01D 53/14* (2006.01)
*B01D 53/18* (2006.01)

(52) U.S. Cl.
CPC ..... *B01D 53/1425* (2013.01); *B01D 53/1462* (2013.01); *B01D 53/1412* (2013.01);
(Continued)

(58) Field of Classification Search
CPC ...... B01D 2252/20478; B01D 53/1412; B01D 53/1425; B01D 53/1462; B01D 53/18
See application file for complete search history.

(56) References Cited

U.S. PATENT DOCUMENTS

| 3,563,695 A * | 2/1971 | Benson | B01D 53/1406 423/223 |
| 2004/0175307 A1* | 9/2004 | Laricchia | B01D 11/043 422/612 |

(Continued)

FOREIGN PATENT DOCUMENTS

| WO | 2013144889 A1 | 10/2013 |
| WO | 2015004130 A1 | 1/2015 |
| WO | WO2018044691 A1 | 3/2018 |

OTHER PUBLICATIONS

International Search Report and Written Opinion of the International Searching Authority; Application No. PCT/US2017/048478; dated Dec. 5, 2017; 12 pages.

(Continued)

*Primary Examiner* — Cabrena Holecek
(74) *Attorney, Agent, or Firm* — Conley Rose, PC

(57) ABSTRACT

Embodiments include systems and methods for processing a feed gas and acid gas removal. A method may comprise receiving a feed gas to an absorber; contacting the feed gas counter-currently with a lean solvent stream to remove acid gas from the feed gas; producing a treated feed gas stream from the absorber; producing a rich solvent stream from the absorber comprising $H_2S$ and $CO_2$ removed from the feed gas; receiving a side stream from the absorber to a side cooler; removing at least a portion of the heat of absorption from the side stream by the side cooler; producing a first output stream from the side cooler that is routed back into the absorber at a point below a draw point for the side stream; and producing a second output stream from the side cooler that is routed back into the absorber at a point below the first output stream.

17 Claims, 2 Drawing Sheets

(52) U.S. Cl.
CPC .... *B01D 53/18* (2013.01); *B01D 2252/20478* (2013.01); *Y02C 10/06* (2013.01)

(56) References Cited

U.S. PATENT DOCUMENTS

| | | |
|---|---|---|
| 2005/0172807 A1 | 8/2005 | Mak |
| 2006/0110300 A1 | 5/2006 | Mak |
| 2009/0293722 A1 | 12/2009 | Svendsen et al. |
| 2010/0132563 A1 | 6/2010 | Pan et al. |
| 2014/0060328 A1* | 3/2014 | Kittel ................ B01D 53/1462 95/235 |
| 2014/0305162 A1* | 10/2014 | Callens ................ C01B 3/506 62/617 |
| 2016/0136566 A1* | 5/2016 | Chiba ................ B01D 53/1412 95/24 |
| 2016/0214057 A1* | 7/2016 | Mathias ................ B01D 53/62 |

OTHER PUBLICATIONS

Foreign Communication from a Related Counterpart—International Preliminary Report on Patentability dated Mar. 14, 2019, International Application No. PCT/US2017/048478 filed Aug. 24, 2017.
Office Action dated Mar. 31, 2019, GCC Patent Application No. 2017/33900 filed Aug. 30, 2016.

* cited by examiner

VARIABLE SIDE COOLING FOR ACID GAS REMOVAL

CROSS-REFERENCE TO RELATED APPLICATIONS

The present application claims priority to U.S. Provisional Patent Application Ser. No. 62/381,138 filed Aug. 30, 2016 by Steven van Wagensveld, et al. and entitled "Variable Side Cooling for Acid Gas Removal" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Acid gas removal refers to a group of processes that use aqueous solutions of various alkyl amines (or amines) to remove hydrogen sulfide ($H_2S$) and carbon dioxide ($CO_2$) from gases. It is a common process unit used in refineries, and is also used in petrochemical plants, natural gas processing plants and other industries. Acid gas removal may be achieved using an acid gas removal unit (AGRU).

SUMMARY

In an embodiment, a method of processing a feed gas may comprise receiving a feed gas to an absorber; contacting the feed gas counter-currently with a lean solvent stream to remove acid gas from the feed gas; producing a treated feed gas stream from the absorber; passing the treated feed gas stream to further processing; producing a rich solvent stream from the absorber, wherein the rich solvent stream comprises $H_2S$ and $CO_2$ removed from the feed gas; receiving a side stream from the absorber to a side cooler; removing at least a portion of the heat of absorption from the side stream by the side cooler; producing a first output stream from the side cooler that is routed back into the absorber at a point below a draw point for the side stream; and producing a second output stream from the side cooler that is routed back into the absorber at a point below the first output stream.

In an embodiment, a processing system may comprise an absorber configured to receive a feed gas and counter-currently contact the feed gas with a lean solvent stream to remove acid gas from the feed gas, wherein the absorber is configured to produce a treated feed gas stream from the absorber and pass the treated feed gas stream to further processing, wherein the absorber is further configured to produce a rich solvent stream from the absorber, wherein the rich solvent stream comprises $H_2S$ and $CO_2$ removed from the feed gas; an absorber side cooler configured to receive a side stream from the absorber and remove at least a portion of the heat of absorption from the side stream; a first output stream from the side cooler that is routed back into the absorber at the tray below a draw point for the side stream; and a second output stream from the side cooler that is routed to a point below the first output stream.

In an embodiment, an absorber for use in an acid gas removal process may comprise a side cooler configured to receive a side stream from the absorber and remove at least a portion of the heat of absorption from the side stream; a first output stream from the side cooler that is routed back into the absorber at the tray below a draw point for the side stream; and a second output stream from the side cooler that is routed to a point below the first output stream, wherein the absorber is configured to receive a feed gas and counter-currently contact the feed gas with a lean solvent stream to remove acid gas from the feed gas, wherein the absorber is configured to produce a treated feed gas stream from the absorber and pass the treated feed gas stream to further processing, wherein the absorber is further configured to produce a rich solvent stream from the absorber, and wherein the rich solvent stream comprises $H_2S$ and $CO_2$ removed from the feed gas.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Alkanolamines are commonly used as chemical solvents to remove acid gases, such as hydrogen sulfide ($H_2S$) and carbon dioxide ($CO_2$), from hydrocarbon feed gas streams. This is achieved by contacting the feed gas with the alkanolamine solvent (generally in a liquid form) in an absorber column. When chemical solvents, such as alkanolamines, are used for acid gas removal, there is a certain amount of heat generated during the absorption (removal) that increases the temperature of the solvent. In some instances, a side cooler is employed to remove some of the generated heat to improve acid gas removal (absorption improves with lower solvent temperatures) and reduce the temperature of the solvent in the lower section of the absorber column. The temperature profile in the lower section of the absorber can vary significantly depending on operating conditions. This can result in the side cooler not operating per design, which can lead to a high rich solvent temperature and operating difficulties in downstream equipment. The present systems and methods address this problem.

Figure 1:
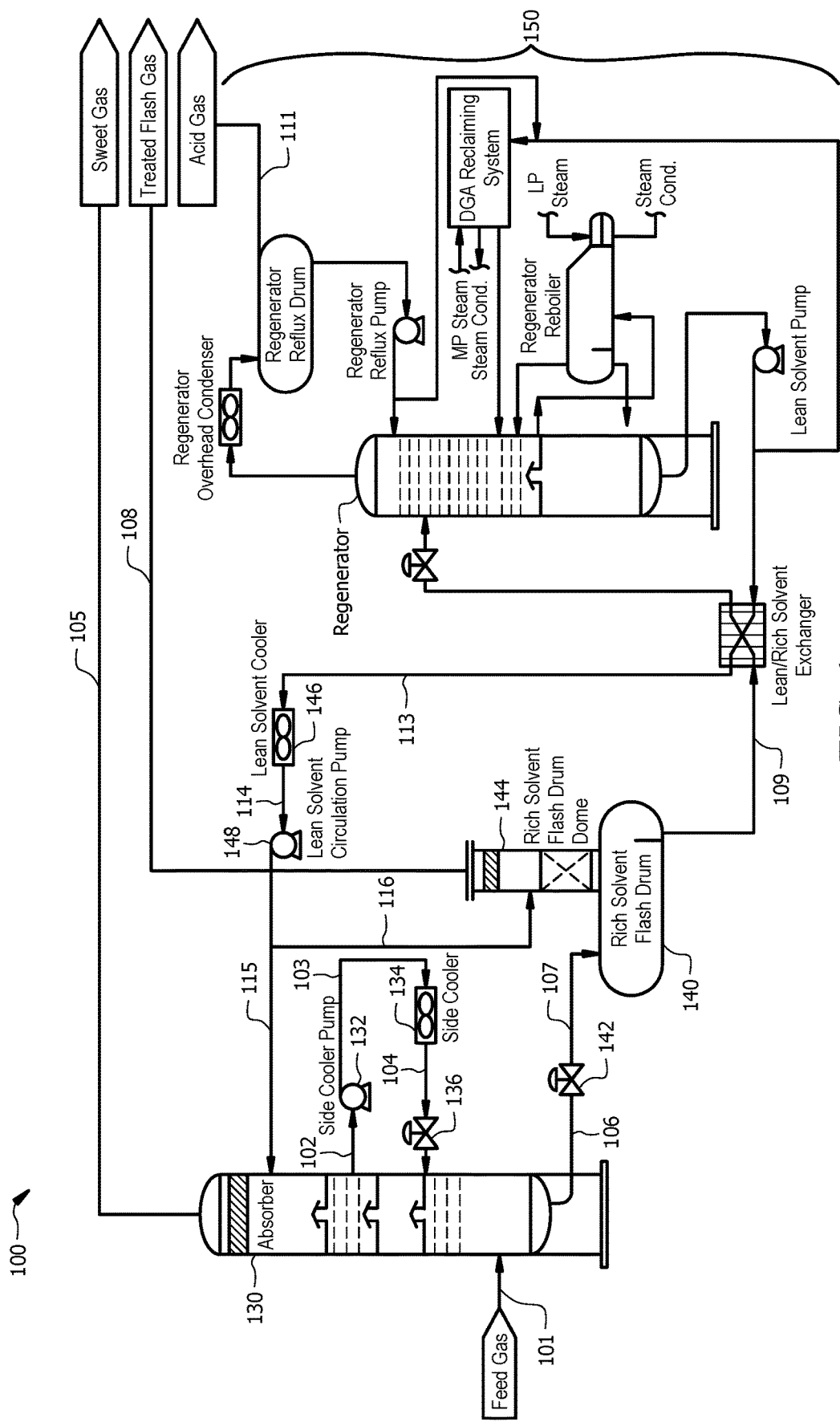
FIG. 1 illustrates a flowsheet that shows the general configuration of an acid gas removal process.

FIG. 1 is a flowsheet that shows the general configuration of a process 100 representing a typical AGRU process. In this configuration, the feed gas 101 is fed to the absorber 130 where it is contacted counter-currently with a lean solvent stream 115 to remove the acid gas. The treated feed gas stream 105 leaves the top of the absorber 130 for further processing, and the rich solvent stream 106 containing the $H_2S$ and $CO_2$ removed from the feed gas leaves the bottom of the absorber 130. A side draw stream 102 of liquid from the absorber 130 is pumped, as stream 103 via pump 132, through the absorber side cooler 134 to remove the heat of absorption. The entire cooled stream 104 is returned back to the Absorber 130, for example at or above the tray just below the draw point for side draw stream 102. The flow rate of the cooled stream 104 may be controlled using a valve 136.

The rich solvent stream 106 from the absorber 130 can be flashed across a valve 142 to a lower pressure in order to remove most of the hydrocarbons entrained and/or co-absorbed in the solvent. This flashed stream 107 is sent to the rich solvent flash drum 140 for separation. Since some $H_2S$ and $CO_2$ are flashed as well, the rich solvent flash drum 140 has a dome 144 in which the flashed gas is contacted counter-currently with a lean solvent stream 116. The treated flash gas stream 108 leaves the top of the dome 144 and is usually routed to either the facility fuel gas system or is recycled back to the front of the process, depending on the desired acid gas content in the treated flash gas.

The rich solvent from the rich solvent flash drum dome 144 combines with the rich solvent from stream 107 and is routed to the solvent regeneration system 150 as stream 109. The regenerated (lean) solvent stream 113 returning from the solvent regeneration system 150 is cooled in the lean solvent cooler 146, and then the cooled stream 114 is pumped, as stream 115 and stream 116 via the pump 148, to the absorber column 130 and the rich solvent flash drum dome 144 for acid gas removal. The solvent regeneration system 150 may produce a removed acid gas stream 111.

The location of the side cooler 134 (e.g., the tray from which the liquid is drawn) is important to maintain the operating conditions of the absorber system within desired ranges. Simulation results and previous operating experience usually indicate the side cooler location for new installations. However, for feed gases that are very sour (e.g. 10 mol % or higher $H_2S$ and/or 5 mol % or higher $CO_2$) and/or high pressure, predicting the correct location for the side cooler 134 can be difficult due to inaccurate simulation results and lack of experience with similar feed gas conditions. Amines can react very quickly with acid gases, especially so at high pressures and high $H_2S/CO_2$ concentrations. The fluid temperature at the trays in the bottom of the absorber column 130 can increase very rapidly and result in high solvent temperatures leaving the bottom of the absorber 130 if the side cooler 134 does not adequately remove the heat of absorption. If the side cooler 134 is located too high on the absorber column 130 (too many trays above where the majority of the acid gas removal is occurring), the solvent draw to the side cooler 134 may be only slightly warmer than the cooling medium (usually air) and there is not enough temperature differential to remove the heat of absorption. Additionally, if the feedstock changes from the design composition, e.g. there is more acid gas in the feed gas, the solvent absorption reaction will occur even more rapidly and may further exacerbate the issue. Hotter rich solvent leaving the absorber 130 may result in more flash gas in the rich solvent flash drum 140. Most of the incremental flash gas from hotter rich solvent temperatures is $H_2S$ and $CO_2$, which makes it harder to meet the acid gas content specification in the treated flash gas without circulating more solvent. Circulating more solvent can result in more pumping power required, more cooling duty in the lean solvent cooler 146, and higher steam requirements in the solvent regeneration system 150.

Hotter rich solvent leaving the absorber 130 may also result in more pressure drop in piping and equipment. Hotter rich solvent leaving the absorber 130 may also result in hotter lean solvent temperatures returning from the solvent regeneration system, which results in more duty required in the lean solvent cooler 146.

Embodiments of the disclosure provide flexibility in operation that can help address high rich solvent temperatures. This flexibility allows for operation within the original design parameters even if the side cooler is not in an optimal location. The flexibility will also allow for better optimization of the overall unit even with changes in feed composition, feed gas pressure, and ambient temperature (which affects air-cooled side coolers and lean solvent coolers).

Figure 2:
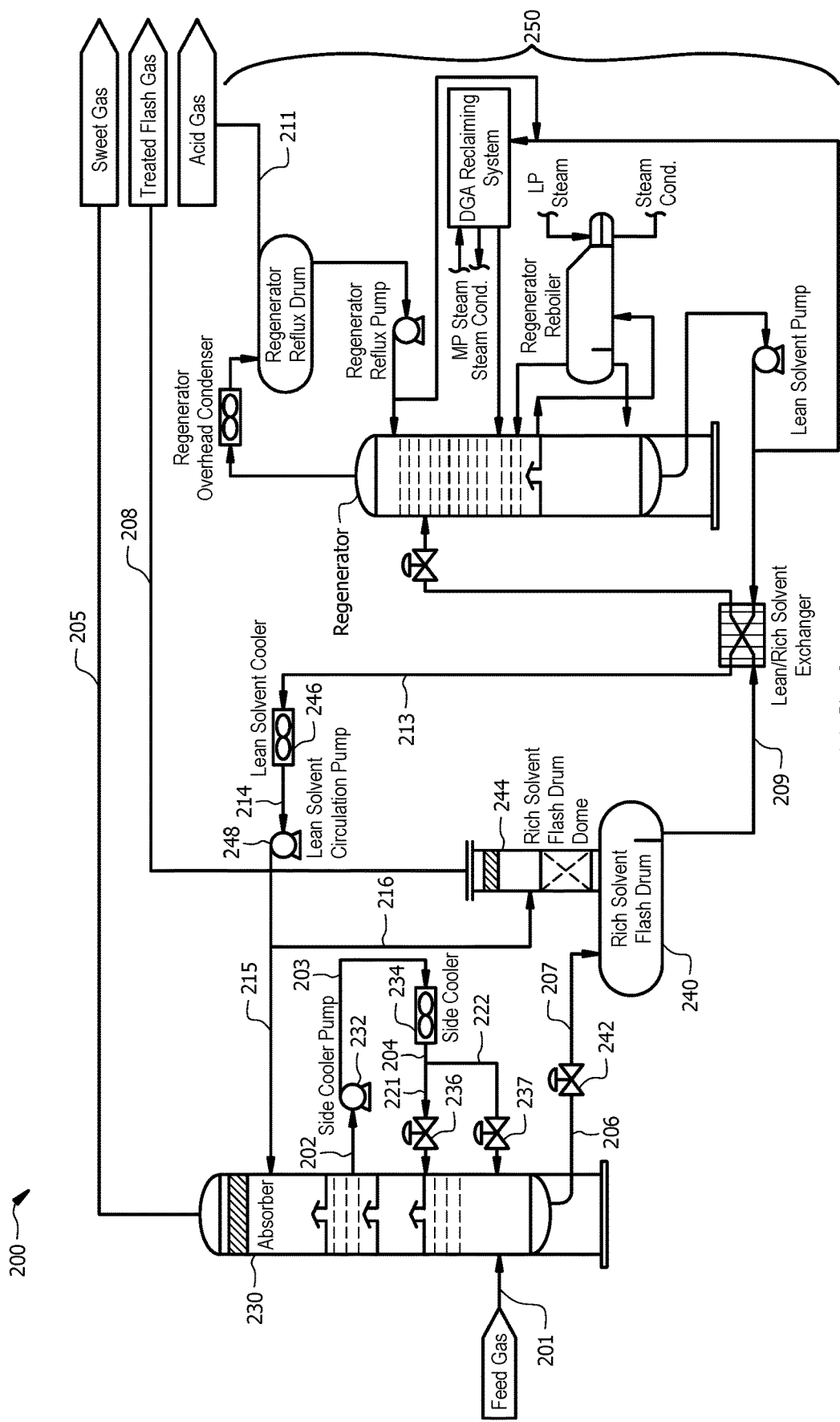
FIG. 2 illustrates a flowsheet that shows the general configuration of another acid gas removal process.

FIG. 2 is a flowsheet that shows the general configuration of an exemplary process 200 that incorporates routing of the cooled liquid from the side cooler. The concepts disclosed herein can be applied to any acid gas removal process that employs a side cooler in the absorber and is not limited to the illustrated process. The configuration is largely the same as that shown in FIG. 1 except for the routing of the cooled liquid from the side cooler 234.

The feed gas 201 is fed to the absorber 230 where it is contacted counter-currently with a lean solvent stream 215 to remove the acid gas. The treated feed gas stream 205 leaves the top of the absorber 230 for further processing, and the rich solvent stream 206 containing the $H_2S$ and $CO_2$ removed from the feed gas leaves the bottom of the Absorber 230. A side draw stream 202 of liquid from the absorber 230 is pumped, as stream 203 via pump 232, through the absorber side cooler 234 to remove the heat of absorption. The rich solvent 206 from the absorber 230 is flashed across a valve 242 to a lower pressure in order to remove most of the hydrocarbons entrained and/or co-absorbed in the solvent. This flashed stream 207 is sent to the rich solvent flash drum 240 for separation. Since some $H_2S$ and $CO_2$ are flashed as well, the rich solvent flash drum 240 has a dome 244 in which the flashed gas is contacted counter-currently with a lean solvent stream 216. The treated flash gas stream 208 leaves the top of the dome 244 and is usually routed to either the facility fuel gas system or is recycled back to the front of the process, depending on the desired acid gas content in the treated flash gas. The rich solvent from the rich solvent flash drum dome 244 combines with the rich solvent from stream 207 and is routed to the solvent regeneration system 250 as stream 209. The regenerated (lean) solvent stream 213 returning from the solvent regeneration system 250 is cooled in the lean solvent cooler 246, and then the cooled stream 214 is pumped, as stream 215 and stream 216 via the pump 248, to the Absorber column 230 and the rich solvent flash drum dome 244 for acid gas removal. The solvent regeneration system 250 may produce a removed acid gas stream 211.

Instead of all of the cooled solvent stream 204 from the side cooler 234 being routed back to the tray below the draw point, the stream 204 may be split, and only some of the liquid is returned for absorption via stream 221 while the remaining cooled solvent is bypassed directly to the bottom of the absorber column 230 via stream 222. By bypassing some of the liquid, there is less solvent in the trays below the side cooler 234 to absorb the acid gas. This effectively limits the absorption reaction on those trays and allows for more absorption to occur higher up the absorber column 230. If there is more absorption on the trays above the side cooler draw, the temperature of the solvent entering the side cooler 234 will be higher, allowing the side cooler 234 to be more effective at heat removal. The temperature of the rich solvent stream 206 from the bottom tray of the absorber 230 will be hotter than if there was no bypass stream 222, but once it is mixed with the cooled bypass stream 222, the overall rich solvent temperature of stream 206 leaving the absorber 230 will be cooler.

The use of a plurality of valves 236 and 237 can allow the relative ratio of the streams passing back to the tray below the draw point (stream 221) and the bottom of the column (stream 222) to be controlled based on a desired temperature within the absorber 230 and/or the temperature of the rich solvent stream 206 leaving the absorber 230. This may allow for selectively passing a desired amount of fluid to the appropriate location, and the relative ratio can change depending on the feed gas composition and specifics of the system. In some embodiments, the control valves 236 and 237 and/or the pump 232 can be controlled to control a total flow rate of the solvent passing through the absorber side cooler 234 to further control the temperature profile within the absorber column 230.

Table 1 (below) shows simulation results for a solvent absorber with a side cooler return bypass (i.e. the configuration shown in FIG. 2). The data is based on a feed gas that contains approximately 26 mol % $H_2S$ and 10 mol % $CO_2$ and is fed to the absorber column at 65 barg and 45° C. The solvent concentration is 55 wt %, and the solvent circulation rate is set so that the rich loading is 0.55. The side cooler outlet temperature is set at 60° C. based upon a 10° C. approach to 50° C. air, which is a typical design air temperature for installations in the Middle East. The side cooler draws the liquid leaving Tray 4 and is returned above Tray 3. The rich solvent flash drum operates at 7.5 barg.

TABLE 1

Amine Bypass Ratio vs. Tray Liquid Temperature

| Tray # | 0% Bypass | 10% Bypass | 20% Bypass | 30% Bypass |
|---|---|---|---|---|
| 6 | 61.4° C. | 61.5° C. | 62.0° C. | 62.8° C. |
| 5 | 62.1° C. | 62.7° C. | 63.9° C. | 66.2° C. |
| 4 | 64.3° C. | 65.9° C. | 69.4° C. | 76.3° C. |
| 3 | 67.2° C. | 70.9° C. | 78.8° C. | 89.2° C. |
| 2 | 86.1° C. | 93.7° C. | 100.7° C. | 102.2° C. |
| 1 | 102.2° C. | 103.9° C. | 103.6° C. | 100.0° C. |
| Combined Rich DGA | 102.2° C. | 100.9° C. | 97.7° C. | 91.9° C. |
| Side Cooler Duty (Gcal/hr) | 5.5 | 7.5 | 12.0 | 20.0 |
| Total Flash Gas Rate (kmol/hr) | 261.2 | 236.2 | 192.9 | 145.2 |
| H2S in Flash Gas (kmol/hr) | 108.1 | 93.5 | 67.8 | 39.2 |
| CO2 in Flash Gas (kmol/hr) | 20.5 | 17.1 | 11.4 | 5.6 |

Table 1 illustrates that, with 0% bypass (i.e. the configuration shown in FIG. 1), the side cooler has little temperature differential to work with (liquid inlet at 64.3° C. and outlet at 60° C.) and thus provides only 5.5 Gcal/hr of heat removal. The resulting rich solvent leaving the bottom of the absorber is very hot at over 102° C. The data shows that as the amount of bypass increases, the liquid temperature from Tray 4 increases, enabling the side cooler to remove more heat from the column and decrease the rich solvent temperature at the bottom of the absorber. At 30% bypass, the bottoms temperature is 10° C. less than the case with no bypass, which results in a 65% reduction in acid gas flashing off in the Rich Solvent Flash Drum. The amount of bypass can be increased further to target a lower bottoms temperature, but the size of the side cooler and the reduction in liquid traffic in the bottom trays must be taken into account.

Compared to current solutions, the configurations described herein require relatively inexpensive modifications. An additional control valve and short runs of piping may be all that are required. The control scheme is simple and easy to implement. While it may seem like the most logical approach is to locate the side cooler in the optimal location to maximize heat removal, (1) predicting the optimal location is not always easy, and (2) with a solvent system, there is a downside to removing too much heat and having a low rich solvent temperature. One of the benefits of using diglycolamine (DGA) solvent for acid gas removal is that it also removes Carbonyl Sulfide (COS) from the feed gas stream. Many very sour gas fields also contain COS, so COS removal can be very important and makes DGA solvent an ideal candidate for the acid gas removal solvent. However, effective removal of COS by DGA solvent favors higher temperatures (approximately 90° C. is optimal) and sufficient residence time in the absorber column at these temperatures. If the side cooler is located too close to the feed gas inlet tray, the tray temperatures below the side cooler may not be hot enough and/or there may not be enough residence time before the side cooler removes heat to facilitate COS removal. The disclosed embodiments provide sufficient temperature/residence time for COS removal by allowing for more trays below the side cooler to operate at hotter temperatures, but it still results in a cooler rich solvent stream leaving the absorber.

Some of the advantages provided by the disclosed configuration include improved ability to manage the absorber temperature profile; reduced rich solvent temperature from the absorber which results in reduced flash gas flow rate from the flash drum; less solvent required in the flash drum dome to achieve acid gas removal from the flash gas; reduced pressure drop in rich solvent piping and equipment; and reduced power requirements the Lean Solvent Cooler and various pumps in the process. Also, more flexibility in the absorber operation allows for better optimization of the process compared to prior art wider range of feed gas compositions, and increased AGRU capacity, and the proposed solution does not sacrifice COS removal to achieve lower rich solvent temperature.

The future will have more very-sour-gas developments in areas such as the Middle East and Caspian Sea. Most of these developments will include an AGRU with side cooling.

In an embodiment, a processing system may comprise an absorber configured to receive a feed gas, wherein the feed gas is contacted counter-currently with a lean solvent stream to remove acid gas from the feed gas; a treated feed gas stream from the absorber to further processing; a rich solvent stream from the absorber to further processing, containing $H_2S$ and $CO_2$ removed from the feed gas; an absorber side cooler configured to remove the heat of absorption from a side stream of the absorber; a first output stream from the side cooler that is routed back into the absorber at the tray below a draw point for the side stream; and a second output stream from the side cooler that is routed directly to the bottom of the absorber.

In a first embodiment, a method of processing a feed gas may comprise receiving a feed gas to an absorber; contacting the feed gas counter-currently with a lean solvent stream to remove acid gas from the feed gas; producing a treated feed gas stream from the absorber; passing the treated feed gas stream to further processing; producing a rich solvent stream from the absorber, wherein the rich solvent stream comprises $H_2S$ and $CO_2$ removed from the feed gas; receiving a side stream from the absorber to a side cooler; removing at least a portion of the heat of absorption from the side stream by the side cooler; producing a first output stream from the side cooler that is routed back into the absorber at a point below a draw point for the side stream; and producing a second output stream from the side cooler that is routed back into the absorber at a point below the first output stream.

A second embodiment can include the method of the first embodiment, wherein the second output stream from the side cooler is routed directly to the bottom of the absorber.

A third embodiment can include the method of the first or second embodiments, further comprising adjusting the ratio of the first output stream to the second output stream to achieve a desired temperature within the absorber.

A fourth embodiment can include the method of the third embodiment, wherein adjusting the flow rates of the first output stream and the second output stream comprises adjusting a flow valve controlling at least one of the first output stream and the second output stream.

A fifth embodiment can include the method of the third or fourth embodiments, wherein adjusting the ratio of the first output stream to the second output stream comprises adjusting the flow rates of at least one of the first output stream and the second output stream.

A sixth embodiment can include the method of any of the first to fifth embodiments, further comprising adjusting the flow rates of at least one of the first output stream and the second output stream to achieve a desired temperature of the rich solvent leaving the absorber.

A seventh embodiment can include the method of any of the first to sixth embodiments, wherein the first output stream is returned to the absorber at a tray that is directly below the draw point for the side stream.

In an eighth embodiment, a processing system may comprise an absorber configured to receive a feed gas and counter-currently contact the feed gas with a lean solvent stream to remove acid gas from the feed gas, wherein the absorber is configured to produce a treated feed gas stream from the absorber and pass the treated feed gas stream to further processing, wherein the absorber is further configured to produce a rich solvent stream from the absorber, wherein the rich solvent stream comprises $H_2S$ and $CO_2$ removed from the feed gas; an absorber side cooler configured to receive a side stream from the absorber and remove at least a portion of the heat of absorption from the side stream; a first output stream from the side cooler that is routed back into the absorber at the tray below a draw point for the side stream; and a second output stream from the side cooler that is routed to a point below the first output stream.

A ninth embodiment can include the processing system of the eighth embodiment, wherein the second output stream from the side cooler is routed directly to the bottom of the absorber.

A tenth embodiment can include the processing system of the eighth or ninth embodiments, further comprising a first flow valve configured to control the flow rate of the first output stream, and a second flow valve configured to control the flow rate of the second output stream.

An eleventh embodiment can include the processing system of the tenth embodiment, wherein at least one of the first flow valve and the second flow valve are adjusted to control the ratio of the first output stream to the second output stream to achieve a desired temperature within the absorber.

A twelfth embodiment can include the processing system of the tenth or eleventh embodiments, wherein at least one of the first flow valve and the second flow valve are adjusted to control the ratio of the first output stream to the second output stream to achieve a desired temperature of the rich solvent leaving the absorber.

A thirteenth embodiment can include the processing system of any of the eighth to twelfth embodiments, wherein the second output stream from the side cooler is configured to lower the temperature of the rich solvent stream leaving the absorber.

A fourteenth embodiment can include the processing system of any of the eighth to thirteenth embodiments, wherein the feed gas comprises at least 15 mol % $H_2S$.

A fifteenth embodiment can include the communication system of any of the eighth to fourteenth embodiments, wherein the feed gas comprises at least 10 mol % $CO_2$.

In a sixteenth embodiment, an absorber for use in an acid gas removal process may comprise a side cooler configured to receive a side stream from the absorber and remove at least a portion of the heat of absorption from the side stream; a first output stream from the side cooler that is routed back into the absorber at the tray below a draw point for the side stream; and a second output stream from the side cooler that is routed to a point below the first output stream, wherein the absorber is configured to receive a feed gas and counter-currently contact the feed gas with a lean solvent stream to remove acid gas from the feed gas, wherein the absorber is configured to produce a treated feed gas stream from the absorber and pass the treated feed gas stream to further processing, wherein the absorber is further configured to produce a rich solvent stream from the absorber, and wherein the rich solvent stream comprises $H_2S$ and $CO_2$ removed from the feed gas.

A seventeenth embodiment can include the absorber of the sixteenth embodiment, wherein the second output stream from the side cooler is routed directly to the bottom of the absorber.

An eighteenth embodiment can include the absorber of the sixteenth to seventeenth embodiments, wherein the second output stream from the side cooler is configured to lower the temperature of the rich solvent stream leaving the absorber.

A nineteenth embodiment can include the absorber of any of the sixteenth to eighteenth embodiments, further comprising a first flow valve configured to control the flow rate of the first output stream, and a second flow valve configured to control the flow rate of the second output stream.

A twentieth embodiment can include the absorber of the nineteenth embodiment, wherein a desired temperature within at least one of the absorber and the rich solvent stream is controlled by adjusting at least one of the first flow valve and the second flow valve.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing a feed gas comprising: receiving a feed gas within an absorber; contacting the feed gas counter-currently with a lean solvent stream to remove acid gas from the feed gas; producing a treated feed gas stream from the absorber; producing a rich solvent stream from the absorber, wherein the rich solvent stream comprises $H_2S$ and $CO_2$ removed from the feed gas; passing a side stream of solvent from the absorber to a side cooler; removing at least a portion of a heat of absorption from the side stream by the side cooler to produce a cooled side stream; routing a first portion of the cooled side stream back into the absorber at a point below a draw point for the side stream, wherein the first portion absorbs the acid gas from the feed gas within the absorber; and routing a second portion of the cooled side stream back into the absorber at a point below a location where the first portion of the cooled side stream is routed back into the absorber, wherein the second portion of the cooled side stream from the side cooler is routed directly to a bottom of the absorber, and wherein the second portion does not absorb the acid gas from the feed gas within the absorber.

2. The method of claim 1, further comprising: adjusting a ratio of the first portion of the cooled side stream to the second portion of the cooled side stream to achieve a desired temperature within the absorber.

3. The method of claim 2, wherein adjusting the ratio of the first portion of the cooled side stream to the second portion of the cooled side stream comprises adjusting a flow valve controlling at least one of the first portion or the second portion.

4. The method of claim 2, wherein adjusting the ratio of the first portion of the cooled side stream to the second portion of the cooled side stream comprises adjusting flow rates of at least one of the first portion or the second portion.

5. The method of claim 1, further comprising: adjusting flow rates of at least one of the first portion of the cooled side stream or the second portion of the cooled side stream to achieve a desired temperature of the rich solvent leaving the absorber.

6. The method of claim 1, wherein the first portion of the cooled side stream is returned to the absorber at a tray that is directly below the draw point for the side stream.

7. The method of claim 1, wherein the first portion of the cooled side stream is routed back into the absorber via a first return line configured to pass the first portion of the cooled side stream from the side cooler back into the absorber at a tray below the draw point for the side stream; and
wherein the second portion of the cooled side stream is routed back into the absorber via a second return line.

8. The method of claim 7, further comprising:
controlling, via a first flow valve, a flow rate of the first portion of the cooled side stream, and
controlling, via a second flow valve, a flow rate of the second portion of the cooled side stream.

9. The method of claim 8, further comprising:
controlling a ratio of the first portion of the cooled side stream to the second portion of the cooled side stream via the first flow valve and the second flow valve; and
achieving a desired temperature within the absorber in response to controlling the ratio of the first portion of the cooled side stream to the second portion of the cooled side stream.

10. The method of claim 8, further comprising:
controlling a ratio of the first portion of the cooled side stream to the second portion of the cooled side stream via the first flow valve and the second flow valve; and
achieving a desired temperature of the rich solvent stream leaving the absorber in response to controlling the ratio of the first portion of the cooled side stream to the second portion of the cooled side stream.

11. The method of claim 7, further comprising:
controlling, via a control valve, a flow rate of the second portion of the cooled side stream from the side cooler; and
lowering a temperature of the rich solvent stream leaving the absorber in response to controlling the flow rate of the second portion of the cooled side stream.

12. The method of claim 1, wherein the feed gas comprises at least 10 mol % $H_2S$.

13. The method of claim 1, wherein the feed gas comprises at least 5 mol % $CO_2$.

14. An absorber for use in an acid gas removal process, the absorber comprising:
a side cooler configured to receive a side stream from the absorber and cool the side stream to produce a cooled side stream;
a first return line configured to pass a first output stream from the side cooler back into the absorber at a tray below a draw point for the side stream, wherein the first output stream is configured to be routed back into the absorber to absorb acid gas from the feed gas within the absorber; and
a second return line configured to pass a second output stream from the side cooler to a point below the first output stream, wherein the second output stream from the side cooler is configured to be routed directly to a bottom of the absorber, and wherein the second portion is configured to be routed back into the absorber so as to not absorb the acid gas from the feed gas within the absorber,
wherein:
the absorber is configured to receive a feed gas and counter-currently contact the feed gas with a lean solvent stream to remove acid gas from the feed gas,
the absorber is configured to produce a treated feed gas stream from the absorber,
the absorber is further configured to produce a rich solvent stream from the absorber, and
the rich solvent stream comprises $H_2S$ and $CO_2$ removed from the feed gas.

15. The absorber of claim 14, wherein a control valve is configured to control a flow rate of the second output stream from the side cooler to lower the temperature of the rich solvent stream leaving the absorber.

16. The absorber of claim 14, further comprising a first flow valve configured to control a flow rate of the first output stream, and a second flow valve configured to control a flow rate of the second output stream.

17. The absorber of claim 16, wherein at least one of the first flow valve or the second flow valve is configured to control a desired temperature within at least one of the absorber or the rich solvent stream.

* * * * *